July 1, 1930.  M. J. GRAHAM  1,769,129
GAUGE AND WORK HOLDER
Filed July 9, 1928
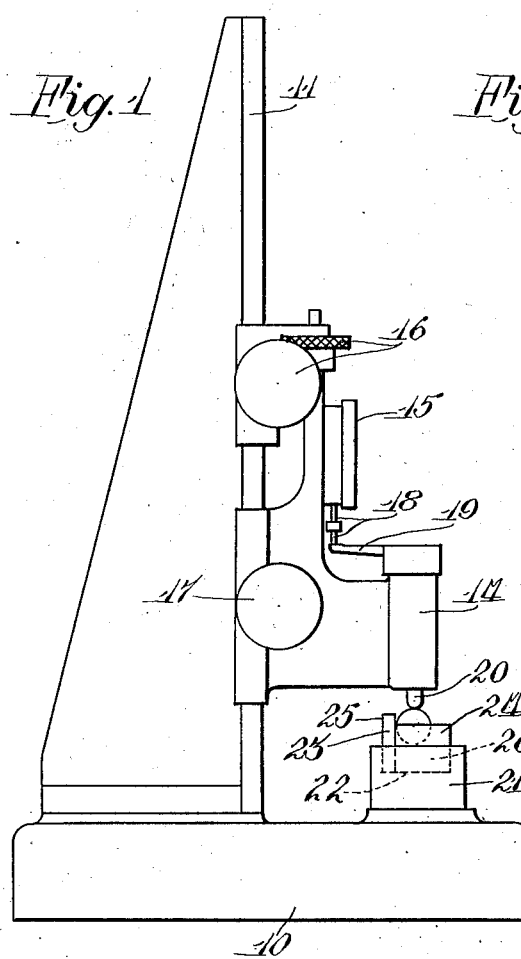
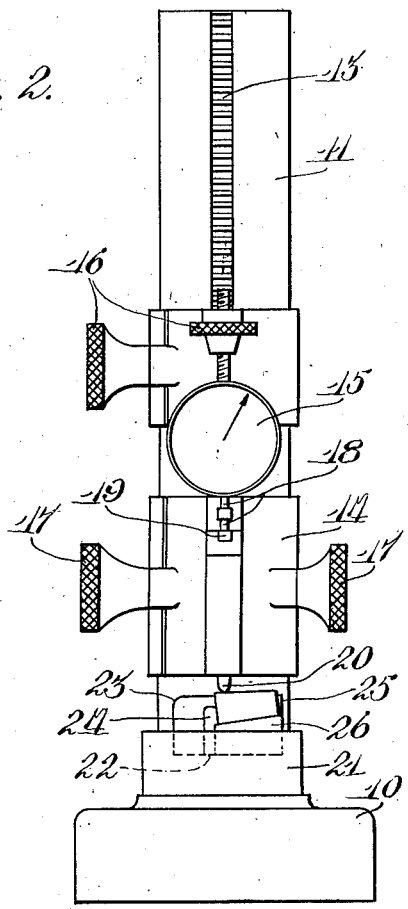
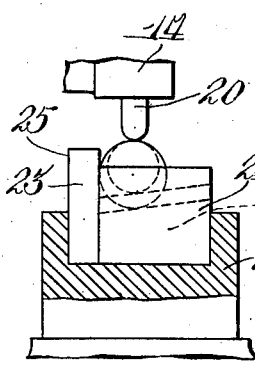
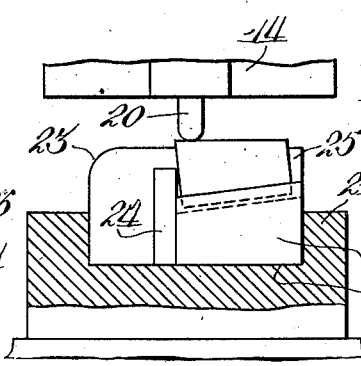
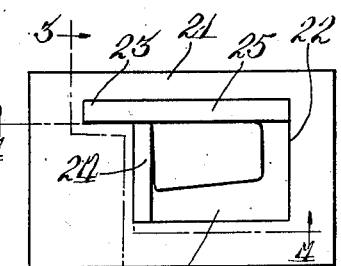
Inventor
Michael J. Graham Patented July 1, 1930

1,769,129

UNITED STATES PATENT OFFICE

MICHAEL J. GRAHAM, OF CHICAGO, ILLINOIS, ASSIGNOR TO INTERNATIONAL HARVESTER COMPANY, A CORPORATION OF NEW JERSEY

GAUGE AND WORK HOLDER

Application filed July 9, 1928. Serial No. 291,449.

This invention is in a gauge and a work holder therefor.

More particularly, the invention relates to a gauge and a work holder adapted to measure and support cylindrical or tapered roller stock for use in roller bearings.

In the manufacture of straight and tapered types of roller bearings, it is very important when the rollers have been finished and are ready for assembly in the completed bearings that these finished rollers be gauged for circumferential size. This circumferential sizing must be within certain prescribed manufacturing tolerances, so that, when the finished roller is assembled in a bearing, it will freely roll to make a perfect anti-friction bearing. Such precision in the size of rollers is especially important in the case of tapered rollers for use in tapered roller bearings, and the present disclosure illustrates the invention as applicable to the gauging of tapered rollers.

Accordingly, the objects of this invention are to provide an improved gauge and work holder for testing the circumferential size of rollers which have been finished and are ready for assembly in roller bearings; to provide an improved work holder which is simple and effective in speeding up the testing operation; to provide a simple form of sizing block which can be produced at a minimum of cost; to provide such a block which will hold the work in an improved manner by preventing endwise and sidewise displacement of the work; and, lastly, as applicable to tapered rollers, to provide a novel form of work holding block provided with means for supporting the roller in such a manner that its upper edge, which will be in contact with the operating member of a gauge, always lies in substantially a horizontal plane. Other objects will be apparent to those skilled in this art.

These desirable objects are accomplished in combination with a gauge structure, of a block which receives the work in a manner to be specified, so that the work is in engagement with a member which operates the gauge for indicating the circumferential size of the work being tested.

In the accompanying sheet of drawings there has been illustrated the preferred embodiment of the invention, and in these drawings,—

Figure 1 is a side elevational view of the gauge structure in combination with the sizing block and a tapered roller therein, which is in position to have its size gauged;

Figure 2 is a front elevational view of the same structure shown in Figure 1;

Figure 3 is an end view of the sizing block partly in section, with a tapered roller therein, as seen along the line 3—3 of Figure 5;

Figure 4 is a front sectional view of the same structure, as seen along the line 4—4 of Figure 5; and Figure 5 is a top plan view of the sizing block.

The gauge structure shown comprises a frame including a base 10, an upright 11 carrying a rack 13 on which is adjustably carried a vertically slidable block 14. This block carries a conventional form of indicator gauge 15 which may be calibrated and set for the proper manufacturing tolerances by means of the adjusting screws 16. Screws 17 are provided for fixing the position of the block 14 on the rack 13. The lower end of the gauge is provided with a stem 18 designed to be operated by a lever 19, which in turn is operated by a plunger 20 adapted to contact the work.

The bed of the machine 10 carries an anvil or block 21, which is provided with a rectangular opening or depression on its top side, indicated at 22, said opening including an extension 23 from one corner thereof, as best shown in Figure 5. Snugly fitted into one of the ends of the depression or opening 22 is a vertically arranged end wall member 24. The opening also is similarly fitted with a vertical, side wall member 25, as best shown in Figure 5, which wall member extends into the extension 23 and meets the end walls 24 at a right angle. A floor member 26 is then fitted into the opening 22, which floor member, if designed for supporting tapered rollers, slopes in two directions. One of these slopes is in the direction of the end wall 24, and the other slope is in the direction of the side wall 25, as best shown in Figures 3 and 4. It can now be seen that the floor part, the end wall part, and the side wall part cooperate to form a pocket adapted to receive, in the preferred form illustrated, a tapered roller bearing. The slopes mentioned are complementary or coincide with the conical slope of the tapered roller and, as a result, the upper edge of the roller always lies in a horizontal plane. The gauge structure, it will be understood, has been adjusted in such a manner as to cause the lower end of the plunger 20 to contact the upper edge of the rollers adjacent its large end.

In operation, after the block has been assembled, an operator takes the finished tapered roller and lays it in the pocket of the block with the enlarged end of the roller contacting the lower end of the plunger 20. As the work lies loosely in the pocket, the operator can rotate the same by hand and, as a result, any variations in circumferential size will re-act on the plunger 20 and cause the needle of the gauge 15 to give an indication of any inaccuracies in size, as will be understood.

From this description it can now be appreciated that a simple gauge and sizing block structure has been provided which achieves all of the desirable objects heretofore recited.

It is to be understood that it is intended to cover all such changes and variations of the preferred embodiment herein illustrated as do not materially depart from the spirit and scope of this invention as is indicated in the appended claims.

What is claimed as new is:

1. The combination with a measuring structure comprising a frame, an indicator gauge thereon, and a plunger for operating the same, of a sizing block on the frame, said block being provided with an opening, a vertical side wall member therein, a vertical end wall member therein, a floor member therein, said members cooperating to form a pocket for rotatably supporting a roller in engageent with the plunger which operates the indicator.

2. The combination with a measuring device comprising a frame, an indicator gauge thereon, and a plunger for operating the same, of a block on the frame, said block being provided with a rectangular opening, a vertical side wall member therein, a vertical end wall member therein, a sloped floor member therein, said members cooperating to form a pocket for loosely and rotatably supporting a tapered roller with its upper edge lying in a horizontal plane in contact with the plunger which operates the gauge.

3. A sizing block for use in a gauge structure, said block having an opening provided with a removable sloped floor member, a removable vertical end wall member in the opening, a removable vertical side wall member in the opening, said parts cooperating to form a pocket for loosely supporting a tapered roller in a manner to cause its upper edge to lie in substantially a horizontal plane.

4. A block for use in a gauge structure, said block having an opening provided with a removable sloped floor member sloping in two directions, a removable vertical end wall member fitted in the opening, a removable vertical side wall member fitted in the opening and meeting the first wall at a right angle, said walls and floor forming a pocket for loosely supporting a tapered roller in a manner to cause its upper edge to lie substantially in a horizontal plane.

In testimony whereof I affix my signature.

MICHAEL J. GRAHAM.